(12) United States Patent
Lutz

(10) Patent No.: US 6,464,212 B2
(45) Date of Patent: Oct. 15, 2002

(54) PRESSURE VESSEL WITH AN ENCLOSED MASS OF GAS

(75) Inventor: Dieter Lutz, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/760,171

(22) Filed: Jan. 12, 2001

(65) Prior Publication Data

US 2001/0008325 A1 Jul. 19, 2001

(30) Foreign Application Priority Data

Jan. 13, 2000 (DE) .......................................... 100 01 104

(51) Int. Cl.$^7$ .................................................. F16F 9/04
(52) U.S. Cl. .............................. 267/64.27; 267/64.23; 138/30
(58) Field of Search ........................... 267/64.27, 64.11, 267/64.28, 64.23, 64.25; 138/30, 26, 31; 60/413, 415, 416; 188/298, 314, 315, 269; 220/500, 501, 530, 590, 720, 721

(56) References Cited

U.S. PATENT DOCUMENTS

| | | | | |
|---|---|---|---|---|
| 3,027,600 A | * | 4/1962 | Stormer et al. | 267/64.27 |
| 3,294,391 A | | 12/1966 | Smith et al. | 267/64.27 |
| 3,625,321 A | * | 12/1971 | Lutz | 188/298 |
| 3,653,651 A | * | 4/1972 | Allinquant et al. | 267/64.27 |
| 3,901,359 A | * | 8/1975 | Jentsch | 188/315 X |
| 3,938,840 A | * | 2/1976 | Haase et al. | 188/298 X |
| 4,702,356 A | | 10/1987 | Katz et al. | 188/315 |
| 4,763,883 A | * | 8/1988 | Crabtree | 267/64.27 |
| 5,323,953 A | * | 6/1994 | Adderley et al. | 228/157 |
| 6,116,585 A | | 9/2000 | Lutz | 267/64.27 |

FOREIGN PATENT DOCUMENTS

| | | |
|---|---|---|
| DE | 197 41 651 | 10/1998 |
| DE | 19835222 A1 * | 2/1999 |

OTHER PUBLICATIONS

Laughner V.–H., Hargan A–D; Fastening and Joining of Metal Parts, McGraw–Hill Book, 1956 S. 248.

Lueger: Lexikon der Fertigungstechnik und Arbeitsmaschinen, Deutsche Verlags–Anstalt Stuttgart Bd. 9 Seite 157–158.

* cited by examiner

Primary Examiner—Pam Rodriguez
(74) Attorney, Agent, or Firm—Cohen, Pontani, Lieberman & Pavane

(57) ABSTRACT

Pressure vessel which is filled with at least one medium which is pre-stressed by a mass of gas enclosed in a deformable enveloping body, in particular for the volume equalization in a vibration damper, comprising a wall in which a pressurized gas is enclosed. The wall is at least partially formed from a gas-tight barrier layer and the enveloping body has sections which are aligned at an angle to one another in the circumferential direction, the wall having an impressed transition between the sections, which are aligned at an angle to one another. The wall may additionally be designed with an expansion profile.

18 Claims, 6 Drawing Sheets

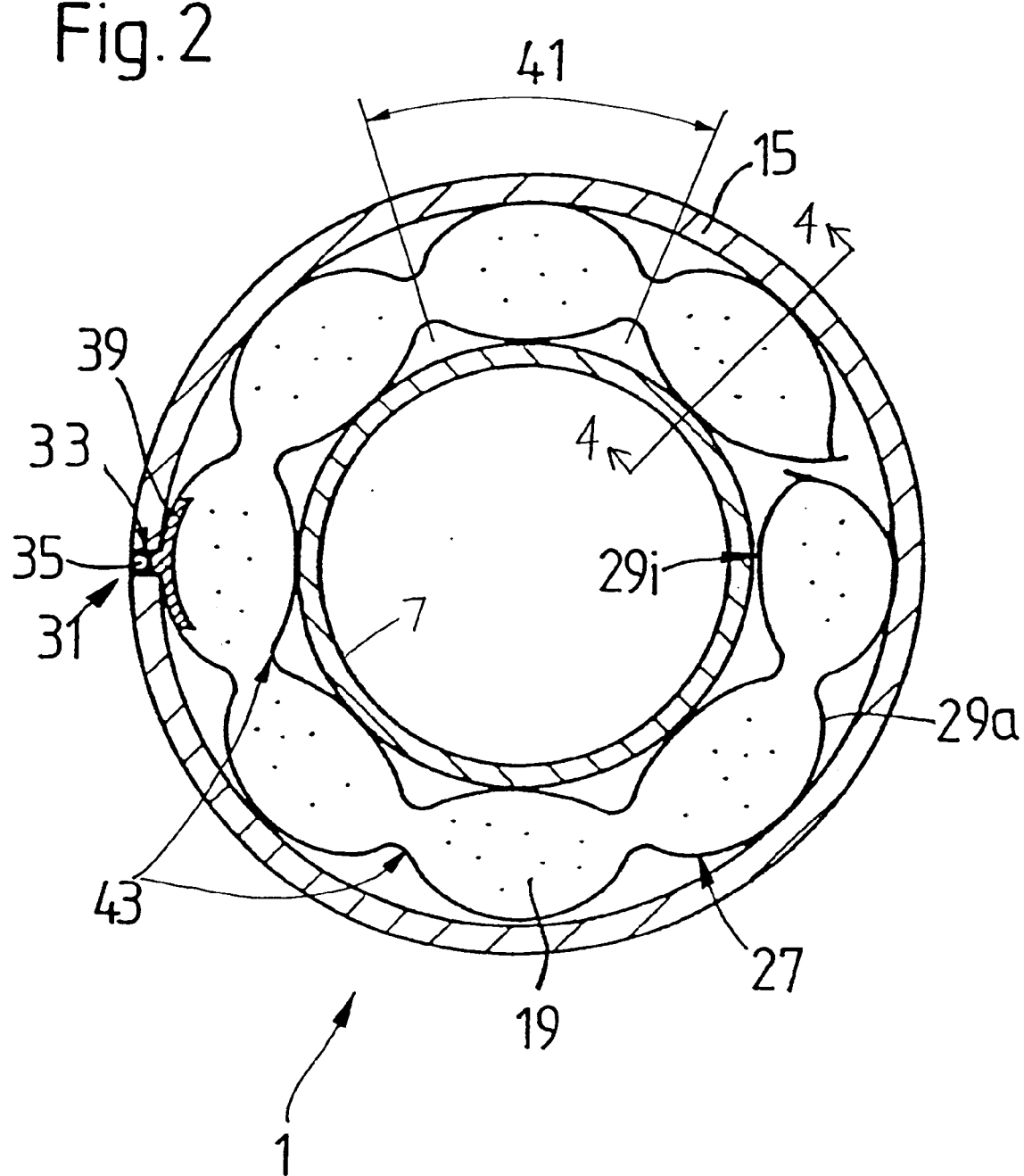

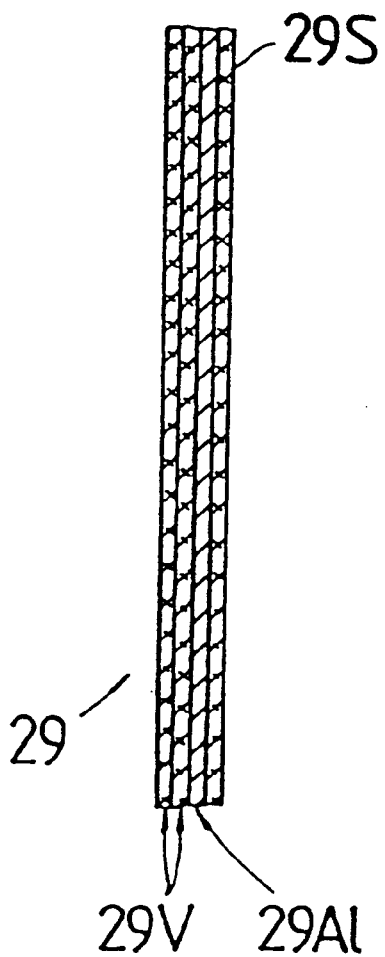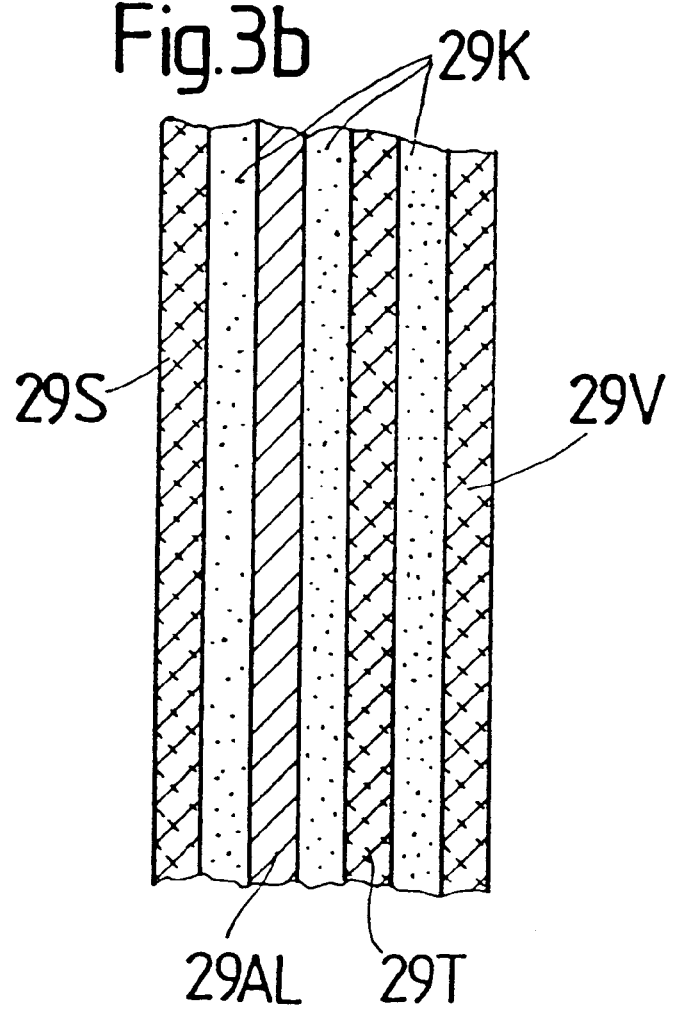

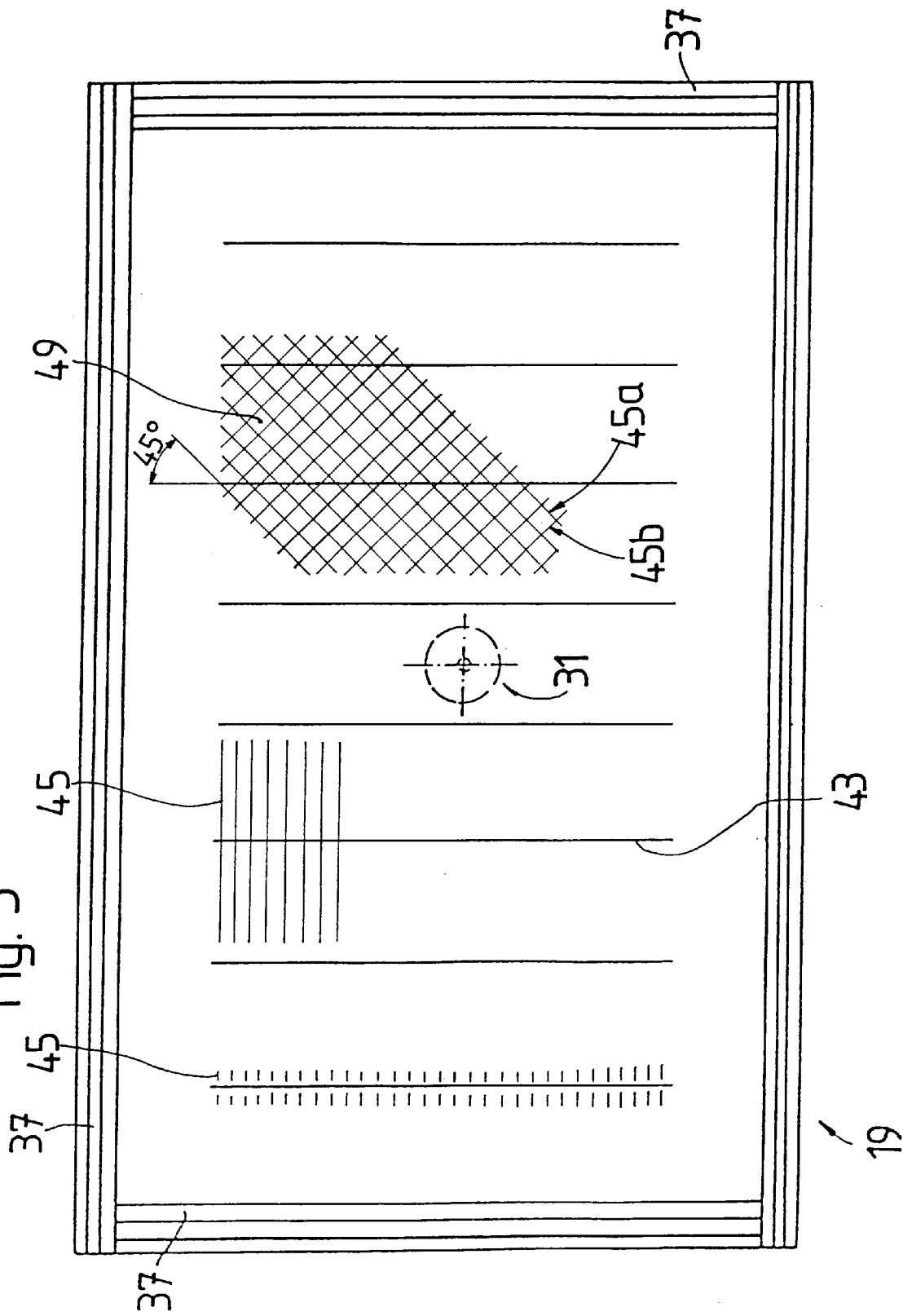

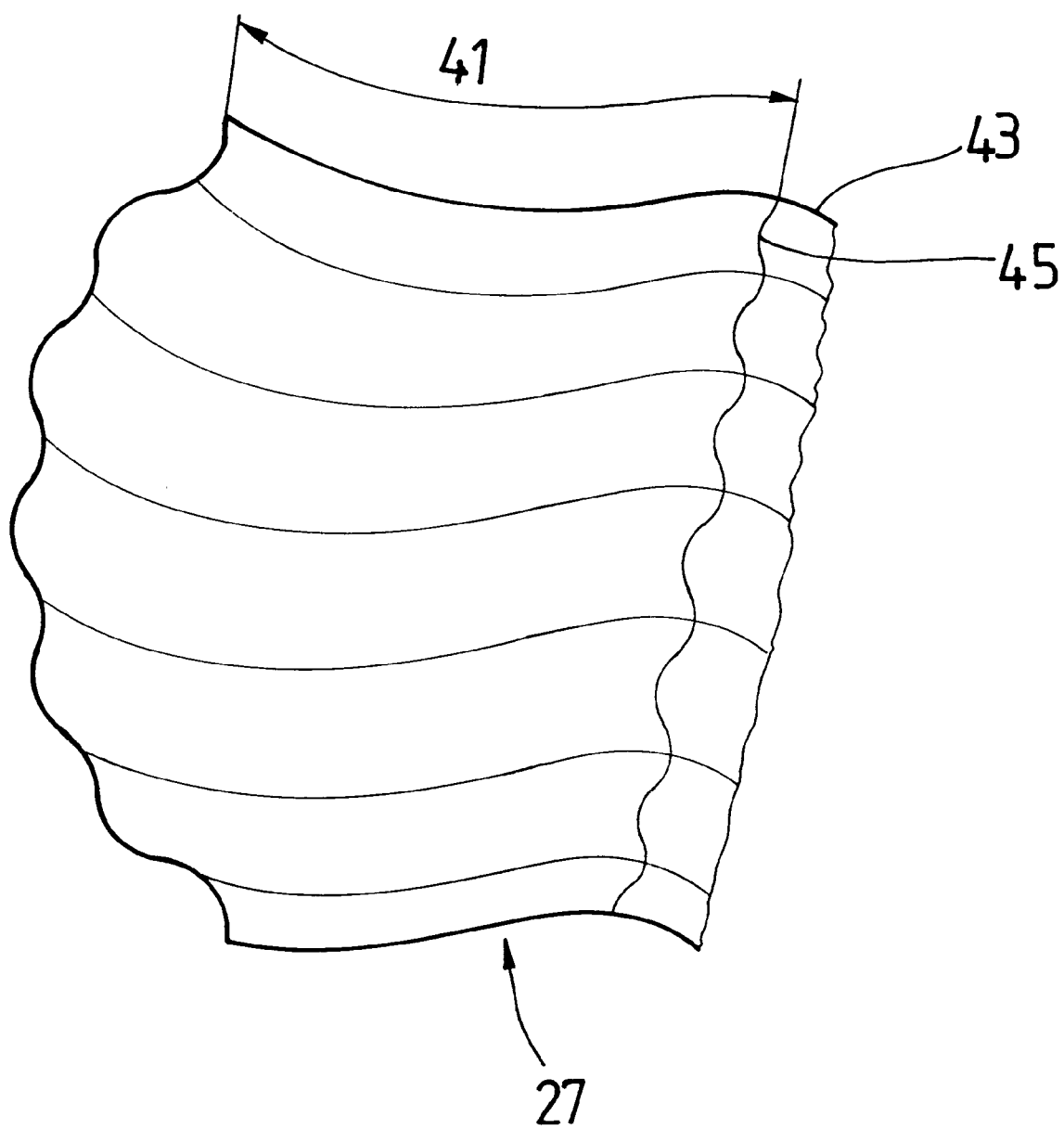

PRESSURE VESSEL WITH AN ENCLOSED MASS OF GAS

BACKGROUND OF THE INVENTION

1. Field of the Invention

The invention relates to a pressure vessel containing a fluid medium which is pre-stressed by a mass of gas enclosed in a deformable enveloping body.

2. Description of the Related Art

Enclosed masses of gas are used, inter alia, wherever a medium is to be put, and retained, under pressure but must not be mixed with an open pressure fluid. They are commonly used in piston/cylinder assemblies such as vibration dampers. Such a vibration damper with an enclosed mass of gas is known, for example, from U.S. Pat. No. 3,294,391, wherein the gas is enclosed in a closed cell polyurethane form. The enclosed mass of gas serves for compensating for the volume of the piston and/or of the piston rod penetrating into the vibration damper. A problem is that gas diffuses through the foam into the damping medium.

U.S. Pat. No. 6,116,585 describes a pressure vessel with a deformable enveloping body in which a mass of gas is enclosed by an impermeable wall. Tests have shown that, at certain locations, the enveloping body has stress peaks which adversely affect the service life of the pressure vessel. In the case of a rectangular pressure vessel which is fitted into a round installation position, for example in a vibration damper, random inflections may be produced. A measure taken in order to avoid these inflections, as can be seen from FIGS. 2 and 4, has been to provide connections 27V and thus to achieve sections which run at an angle in the circumferential direction. The above-mentioned stress peaks occurred thereafter.

A further possibility is to use a round pressure vessel, for example as is illustrated in FIG. 5 of U.S. Pat. No. 6,116,585. The disadvantage with this design is that, for each diameter size of the tube enclosing the pressure vessel, it would be necessary to produce a separate pressure-vessel design if the aim is to use the largest possible pressure vessel and/or if one is seeking optimum utilization of space.

SUMMARY OF THE INVENTION

The object of the present invention is to achieve a pressure vessel, for an enclosed mass of gas, of which the enveloping body has the smallest possible stress peaks.

According to the invention, the enveloping body is formed by inner and outer walls which are provided with impressed transitions between the sections. The inner and outer walls are not connected at the transitions.

The impressed transition prevents the enveloping body from being exposed to undefined inflections and also prevents excessive friction from occurring on the walls. Correspondingly rounded transitions minimize the stress states in the enveloping body, with the result that the service life of the enveloping body can be extended to a decisive extent. In a further advantageous configuration, the impressed transition is designed as a radius.

A further measure according to the invention for minimizing the stress states in the enveloping body consists in the wall being designed with an expansion profile. It is precisely when the wall has a material with a very low level of expansion, e.g. a metal foil, that the expansion of the enveloping body can be achieved by an expansion profile. An expansion profile is to be understood as all folds in the wall which allow a change in length by the fold being straightened out.

The practical configuration of the expansion profile also has to be considered from an economic point of view. A compromise will be sought between production outlay and expansion capacity of the expansion profile. Extensive tests have shown that an expansion profile with a sinusoidal cross section is particularly well suited since, in this case, only extremely small additional stresses are introduced into the foil/sheet material.

It may also be advantageous for the impressed transition between the sections, which are aligned at an angle to one another, and the expansion profile to form a superposed profile. Superposed profile is to be understood in the manner that, for example, rather than interrupting the expansion profile, the impressed formation between the sections, which are aligned at an angle to one another, also contains the expansion profile.

In terms of short cycle times during the production of the pressure vessel, provision may be made for the expansion profile to be restricted to a strip in the region of the impressed transition.

In order to achieve the best possible action of the expansion profile, the latter extends transversely to the longitudinal axis of the enveloping body. In the case of pressure vessels which are subjected to particularly high loading, provision may also be made for the expansion profile to comprise a plurality of individual expansion profiles.

For reasons of strength, provision is made for the expansion profile comprising a plurality of individual expansion profiles to bound lozenge-shaped wall segments. It has proven advantageous here if the expansion profiles run obliquely in relation to the longitudinal axis of the pressure vessel and the resulting corner points of the lozenge-shaped wall segments are located on a pitch circle and on lines parallel to the longitudinal axis.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 2 shows a section perpendicular to the axis of the vibration damper and the enclosed mass of gas, taken along the plane 2—2 of FIG. 1, FIGS. 3a, 3b show a section through the wall of the enveloping body, FIG. 5 shows a plane view of the enveloping body, and FIG. 6 shows an illustration in detail form of the enveloping body.

DETAILED DESCRIPTION OF THE PREFERRED EMBODIMENTS

Figure 1:
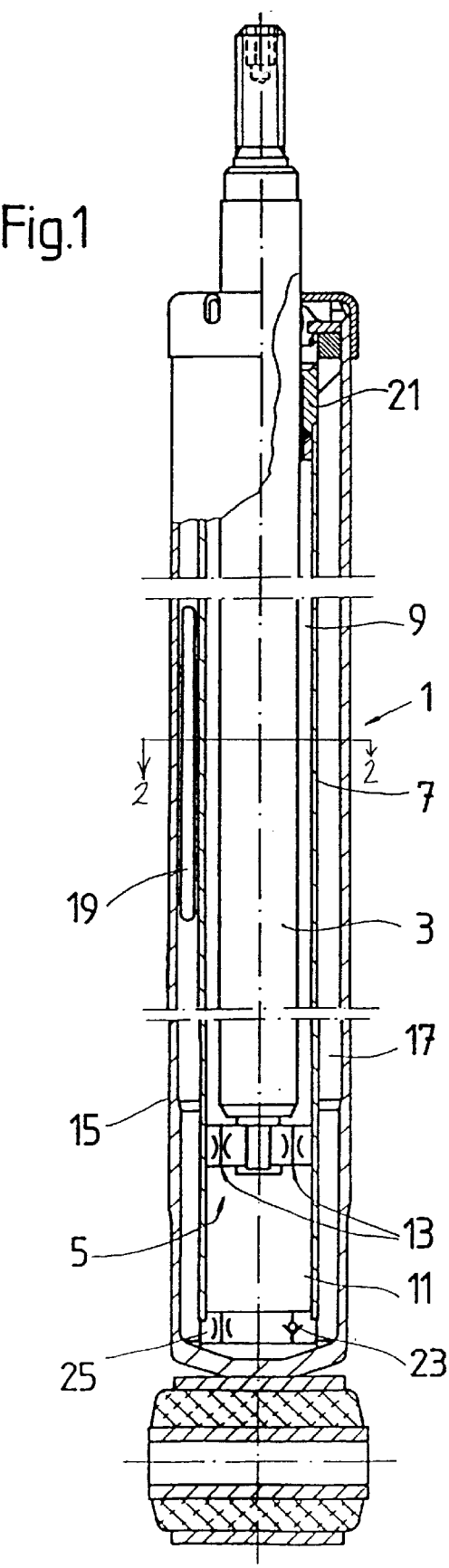
FIG. 1 shows a use example of the enclosed mass of gas in a vibration damper.

FIG. 1 shows a vibration damper 1 known per se of double-tube design in which a piston rod 3 with a piston 5 is guided such that it can be moved axially in a pressure tube 7. The piston 5 separates the pressure tube into a top working chamber 9 and a bottom working chamber 11, the two working chambers being connected via damping valves 13 in the piston.

The pressure tube 7 is encased by a vessel tube 15, the inner wall of the vessel tube and the outer wall of the pressure tube forming an equalization chamber 17 which is completely filled with damping medium and an enclosed mass of gas 19 up to a piston-rod guide 21. Arranged at the bottom end of the working chamber 11 is a base which has, if appropriate, a check valve 23 and a damping valve 25.

In the case of a piston-rod movement, the disclosed piston-rod volume is equalized by a change in volume of the enclosed mass of gas.

FIG. 2 shows a section through the vibration damper 1 in the region of the enclosed mass of gas 19. The enclosed mass of gas comprises enveloping body 27 with a wall 29 which is pressure-filled with a gas, in particular nitrogen. It is alternatively possible to use $CO_2$ or, with correspondingly quick installation, even a liquid gas. The wall 29 has an inner wall 29$i$ and an outer wall 29$a$, which in turn form a start and an end. In this use example, the enclosed mass of gas forms an arc in the equalization chamber 17. In the sectional illustration, it is possible to see sections 41 of the enclosed mass of gas which are arranged in series and are aligned at an angle to one another. The sections 41 are formed by impressed transitions 43 between the inner wall 29$i$ and the outer wall 29$a$, the transitions running parallel to the axis of the vibration damper.

The enclosed mass of gas has a filling connection 31 which is accessible via a filling opening 33 in the vessel tube. During the installation of the vibration damper, the non-filled enveloping body is positioned in the vessel tube 15, the filling connection 31 being fitted into the filling opening. Thereafter, the pressure tube 7 is introduced. The entire vibration damper is then filled with oil, the volume of the oil filling depending on the later operating pressure, which is determined by the enclosed mass of gas when the piston rod is at a standstill. Once the vibration damper has been closed, the enclosed mass of gas can be fed via a filling unit (not illustrated), e.g. injection needle. If the injection needle is removed, the puncture opening closes automatically. Following the filling operation, the filling opening can be closed by a pressed-in ball 35.

FIG. 3$a$ illustrates a section through the wall 29, the inner wall 29$i$ and the outer wall 29$a$ possibly consisting of the same material and/or being of the same construction. The core of the wall is a metal foil, in particular an aluminum foil 29Al, which is only a few $\mu$m thick. Rolled aluminum is particularly suitable above all. The aluminum foil assumes the sealing function for the enclosed gas. Toward the outside, the aluminum foil is coated by a protective sheet material 29S. This protective sheet material promotes the stability, increases the tear strength and prevents pronounced creasing. This layer has a thickness in the same range as the aluminum foil and consists, for example, of PET or polyamide.

Toward the inside, the wall has a weldable coating 29V. The weldable coating may also be of multi-layered, for example two-layered, design and be of approximately four to five times the material thickness of the aluminum foil. In the case of a multi-layered coating 29V, the individual layers are drawn out and applied crosswise to one another. This achieves a high strength and dimensional stability, in particular compensation is provided for inner stresses. PP (polypropylene) and PA (polyacrylate) have proven successful materials. The layer thickness is approximately 50 to 100 $\mu$m. If PA is used in each case for the protective layer and the weld layer, seal welding can be carried out for the enveloping body. In a seal-welding operation, the protective layer is positioned so as to overlap the weld layer and is welded by heat being supplied.

FIG. 3$b$ shows the construction of the enveloping body wall additionally having a carrying layer 29T. The carrying layer ensures the strength in all directions of loading of the enveloping body 29. When the carrying layer is used, the metal foil 29Al can be reduced to the absolute minimum. As a result, the enveloping body becomes more flexible and acquires elastomeric properties. Furthermore, the carrying layer constitutes a protection for the metal foil during the welding operation. It has to be ensured that no operating medium from the pressure vessel comes into contact with the metal foil. Depending on the operating medium, the metal foil may be chemically corroded. It is sought for the metal foil 29Al to be arranged in the neutral fiber of the wall of the enveloping body, in order for the bending stressing to be optimized.

It is possible to apply between the layers an adhesive-bonding layer 29K, for example made of PU (polyurethane), which ensures that the layers are held together securely. The adhesive-bonding layer may be applied in the same way as a conventional adhesive or else may be placed in position as an adhesive-bonding sheet material. Alternatively, it is also possible for the individual layers to be calendered.

Figure 4:
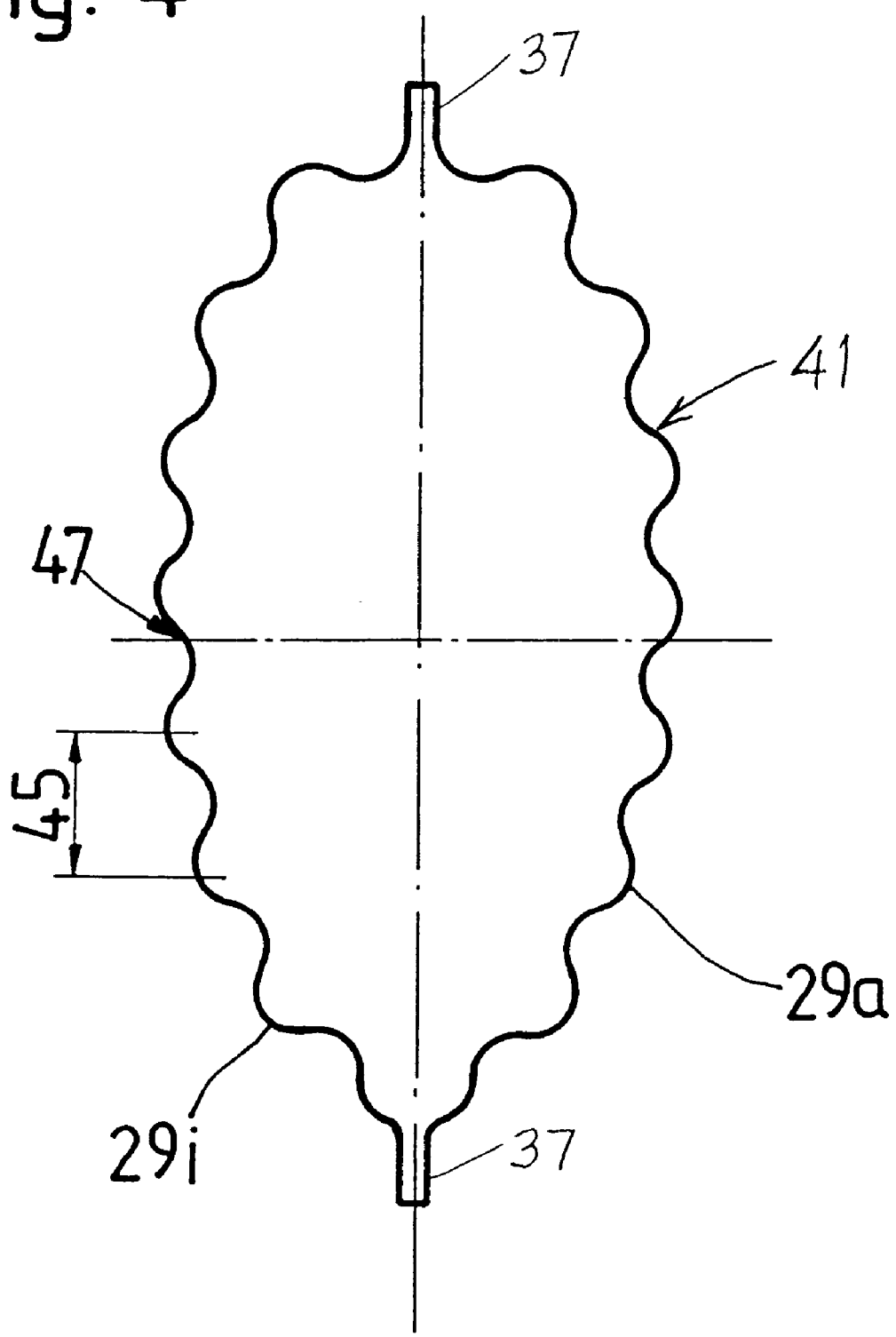
FIG. 4 shows a section view of the enveloping body taken along axial plane 4—4 of FIG. 2.

FIG. 4 shows a longitudinal section through a section 41 of the enveloping body 27. An expansion profile 45 can clearly be seen in this view. The expansion profile is conducive to providing a cushion form of the sections between the impressed transitions 43. In the region of the transitions 43, it is possible for the wall to be positioned in folds and to be straightened out to the maximum extent at the equator 47 of the cushion. A sinusoidal expansion profile is illustrated by way of example. A different fold formation is, of course, also conceivable. The sine profile has, for example, a distance from one harmonic wave to the next harmonic wave of 3 mm and an amplitude of between 0.2 and 0.3 mm.

FIG. 5 illustrates a projected development of the enveloping body 27. Weld seams 37 are located on the border, and these produce a closed body from the inner wall 29$i$ and the outer wall 29$a$. The weldable coating 29V, see FIG. 3, is required for the weld seams 37.

FIG. 5 shows three possible forms of the configuration of the expansion profile 45. In the case of the left-hand variant, the expansion profile 45 is restricted to a strip in the region of the impressed transition 43 since it is at this location that the largest stress peaks, which it is intended to minimize, occur. It is also possible for the expansion profile to run parallel to the weld seams 37, since a larger fold formation is to be expected in this region.

The central expansion profile 45 is of horizontal design. A horizontal expansion profile can be produced particularly easily. The right-hand variant shows an expansion profile 45 which comprises two criss-crossing individual expansion profiles 45$a$; 45$b$, as a result of which lozenge-shaped wall segments 49 are determined. If, as is illustrated, the individual expansion profiles run alternately at 45°, then the points of intersection of the expansion profile are located parallel to the transition sections 43 of the enveloping body 27. This provides a further lasting improvement to the expansion behavior of the sheath since, with application of force to the points of intersection, the expansion is greater than in the case of a horizontal and vertical design of the expansion profile 45.

FIG. 6 is intended to illustrate that the impressed transition 43 between the sections 41 of the enclosed mass of gas and the expansion profile 45 form a superposed profile in which both profile characteristics are maintained.

The above-described application for the vibration damper is only to be taken by way of example. Of course, it is also possible to utilize the spring forces of the enclosed mass of gas. Conceivable, for example, is the use as a pneumatic spring, providing partial or full support, as is used, for example, in chassis technology for level control and hydraulic spring elements. In some applications, e.g. in the case of a single-tube damper as a replacement for the equalization chamber, it is necessary to provide a stop which prevents the enveloping body from lifting. The single-tube vibration damper essentially comprises the same components as the vibration damper of double-tube design according to FIG. 1, identical components having the same designations. A possible stop is, for example, a clamped-in ring or, if present, bottom valve 25.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A pressure vessel which is filled with at least one medium which is prestressed by a mass of gas enclosed in a deformable enveloping body for the volume equalization in a vibration damper having an axis and a circumference, the body comprising a wall in which a pressurized gas is enclosed, the wall comprising an inner wall and an outer wall which are at least partially formed from a gas-tight barrier layer, the enveloping body having sections which are aligned at an angle to one another in the circumferential direction, wherein the enveloping body has an impressed transition between each adjacent pair of the sections, wherein the inner wall and the outer wall are each formed with an impressed radius at each said impressed transition, each said impressed radius in said inner wall extending toward a respective said impressed radius in said outer wall without being connected to said impressed transition in said outer wall.

2. The pressure vessel as claimed in claim 1, wherein at least one of said inner wall and said outer wall is provided with an expansion profile comprising folds which permit deformation of the enveloping body, said folds being provided without reinforcement so that expansion of said enveloping body at said folds is possible.

3. The pressure vessel as claimed in claim 2, wherein the expansion profile has a sinusoidal cross section.

4. The pressure vessel as claimed in claim 2, wherein the impressed transition between the sections and the expansion profile form a superposed profile.

5. The pressure vessel as claimed in claim 2, wherein the expansion profile is restricted to a strip in the region of the impressed transition.

6. The pressure vessel as claimed in claim 2, wherein the folds of the expansion profile extend transversely to the axis of the vibration damper.

7. The pressure vessel as claimed in claim 2, wherein the expansion profile comprises a plurality of individual expansion profiles.

8. The pressure vessel as claimed in claim 7, wherein the individual expansion profiles bound lozenge-shaped wall segments.

9. A vibration damper comprising a pressure vessel with a central axis and a circumference, said vessel containing a fluid damping medium having therein a deformable enveloping body comprising a gas impermeable wall, said wall comprising an inner wall and outer wall having borders which are sealed together to form a gas-tight enclosure containing a mass of gas for pre-stressing said fluid medium, said inner wall and said outer wall being deformed toward each other to form impressed transitions separating sections of said enclosure, said transitions extending parallel to said axis, said inner wall and said outer wall at said transitions not being connected to each other between said borders.

10. The vibration damper as in claim 9, wherein said inner wall and said outer wall are each formed with an impressed radius at each said transition.

11. A vibration damper as in claim 9, wherein the inner wall and the outer wall are each provided with an expansion profile comprising folds which permit deformation of the enveloping body, said folds being provided without reinforcement so that expansion of said enveloping body at said folds is possible.

12. A vibration damper as in claim 11, wherein each expansion profile comprises a sinusoidal cross section extending in the axial direction of the damper, said folds extending transversely of said axial direction.

13. A vibration damper as in claim 12, wherein each said folds extend circumferentially.

14. A vibration damper comprising a pressure vessel with a central axis and a circumference, said vessel containing a fluid damping medium having therein a deformable enveloping body comprising a gas impermeable wall, said wall comprising an inner wall and an outer wall having borders which are sealed together to form a gas-tight enclosure containing a mass of gas for pre-stressing said fluid medium, said inner wall and said outer wall being deformed toward each other to form transitions separating sections of said enclosure, said transitions extending parallel to said axis, said inner wall and said outer wall each being provided with an expansion profile comprising folds which permit deformation of the enveloping body, said folds extending transversely of said transitions, said folds being provided without reinforcement so that expansion of said enveloping body at said folds is possible.

15. A vibration damper as in claim 14, wherein said expansion profile is only provided proximate to the transitions.

16. A vibration damper as in claim 14, wherein said expansion profile extends continuously between transitions.

17. A vibration damper as in claim 14, wherein said wall is provided with two said expansion profiles which are superposed, said superposed expansion profiles each having folds, the folds of one of the expansion profiles extending transversely to the folds of the other expansion profile.

18. A vibration damper as in claim 17, wherein said superposed profiles have folds which extend at 45 degrees to the transitions and at 90 degrees to each other.

* * * * *